US012759537B2

(12) United States Patent
Tan et al.

(10) Patent No.: US 12,759,537 B2
(45) Date of Patent: Oct. 13, 2026

(54) DATA FUSION METHOD, APPARATUS AND NON-TRANSITORY COMPUTER-READABLE STORAGE MEDIUM TO PARK A VEHICLE

(71) Applicant: Nanning FuLian FuGui Precision Industrial Co., Ltd., Nanning (CN)

(72) Inventors: Bing Tan, Nanning (CN); Chia-Hung Wen, Zhunan (TW); Lin-Fen Tang, Nanning (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 10 days.

(21) Appl. No.: 19/062,245

(22) Filed: Feb. 25, 2025

(65) Prior Publication Data

US 2026/0200461 A1 Jul. 16, 2026

(30) Foreign Application Priority Data

Jan. 14, 2025 (CN) ......................... 202510059684.0

(51) Int. Cl.
*B60W 30/06* (2006.01)
*G01S 13/89* (2006.01)
*G06V 10/82* (2022.01)
*G06V 20/56* (2022.01)

(52) U.S. Cl.
CPC ............. *B60W 30/06* (2013.01); *G01S 13/89* (2013.01); *G06V 10/82* (2022.01); *G06V 20/56* (2022.01); *B60W 2420/403* (2013.01); *B60W 2420/408* (2024.01); *B60W 2555/20* (2020.02); *B60W 2556/35* (2020.02)

(58) Field of Classification Search
CPC ........ G06V 20/56; G06V 10/40; G06V 10/82; B60W 30/06; B60W 2555/20; B60W 2556/35; B60W 2420/408
See application file for complete search history.

(56) References Cited

U.S. PATENT DOCUMENTS

2021/0397880 A1* 12/2021 Deng ........................ G06T 7/70
2022/0207868 A1* 6/2022 Zhang ..................... G01S 7/417
2023/0072637 A1* 3/2023 Xia ........................ G06V 20/58
2023/0206653 A1* 6/2023 Sebastian .............. G01S 7/4802
702/3

(Continued)

FOREIGN PATENT DOCUMENTS

CN 105857627 A 8/2016
CN 117133122 A 11/2023
CN 117533326 A 2/2024

(Continued)

*Primary Examiner* — Mirza F Alam
(74) *Attorney, Agent, or Firm* — ScienBiziP, P.C.

(57) ABSTRACT

A data fusion method, apparatus and non-transitory computer-readable storage medium to park a vehicle, the method comprising; using a weather classification model to obtain a weather condition probability based on weather information of a current location of a vehicle and an extracted video clip of the current environment, and obtaining a corresponding weather impact factor based on the weather condition probability. Finally, determining the fusion area where the visual image data and the radar point cloud data are to be fused based on the length of the body of the vehicle, the weather condition probability and the weather impact factor to generate a parking scene image.

9 Claims, 3 Drawing Sheets

(56) References Cited

U.S. PATENT DOCUMENTS

2024/0312218 A1* 9/2024 Krehl .................... G01S 13/931

FOREIGN PATENT DOCUMENTS

| | | | | |
|---|---|---|---|---|
| CN | 117554963 A * | 2/2024 | ........... | G01S 13/931 |
| CN | 118155174 A | 6/2024 | | |
| CN | 118897294 A | 11/2024 | | |
| EP | 4130921 A1 | 2/2023 | | |

* cited by examiner

DATA FUSION METHOD, APPARATUS AND NON-TRANSITORY COMPUTER-READABLE STORAGE MEDIUM TO PARK A VEHICLE

FIELD

A data fusion method, an apparatus and a non-transitory computer readable storage medium to park a vehicle.

BACKGROUND

Intelligent driving and intelligent parking bring convenience to people, but at the same time, how to more effectively and accurately obtain information about the environment around the vehicle has also become a focus of attention.

In existing technologies, image data is obtained from cameras and point cloud data is obtained from millimeter-wave radar, and then the image data is fused with the point cloud data to obtain accurate environmental information such as parking spaces, obstacles, and pedestrians. However, even with the fusion of image data and point cloud data, there is still the problem of high fusion computation, which does not provide accurate environmental information around the vehicle in real time for automatic parking.

BRIEF DESCRIPTION OF THE DRAWINGS

Implementations of the present technology will now be described, by way of example only, with reference to the attached figures, wherein.

DETAILED DESCRIPTION

It should be understood that the detailed description and specific examples, while indicating exemplary embodiments, are intended for purposes of illustration only and are not intended to limit the scope of the claims.

Figure 1:
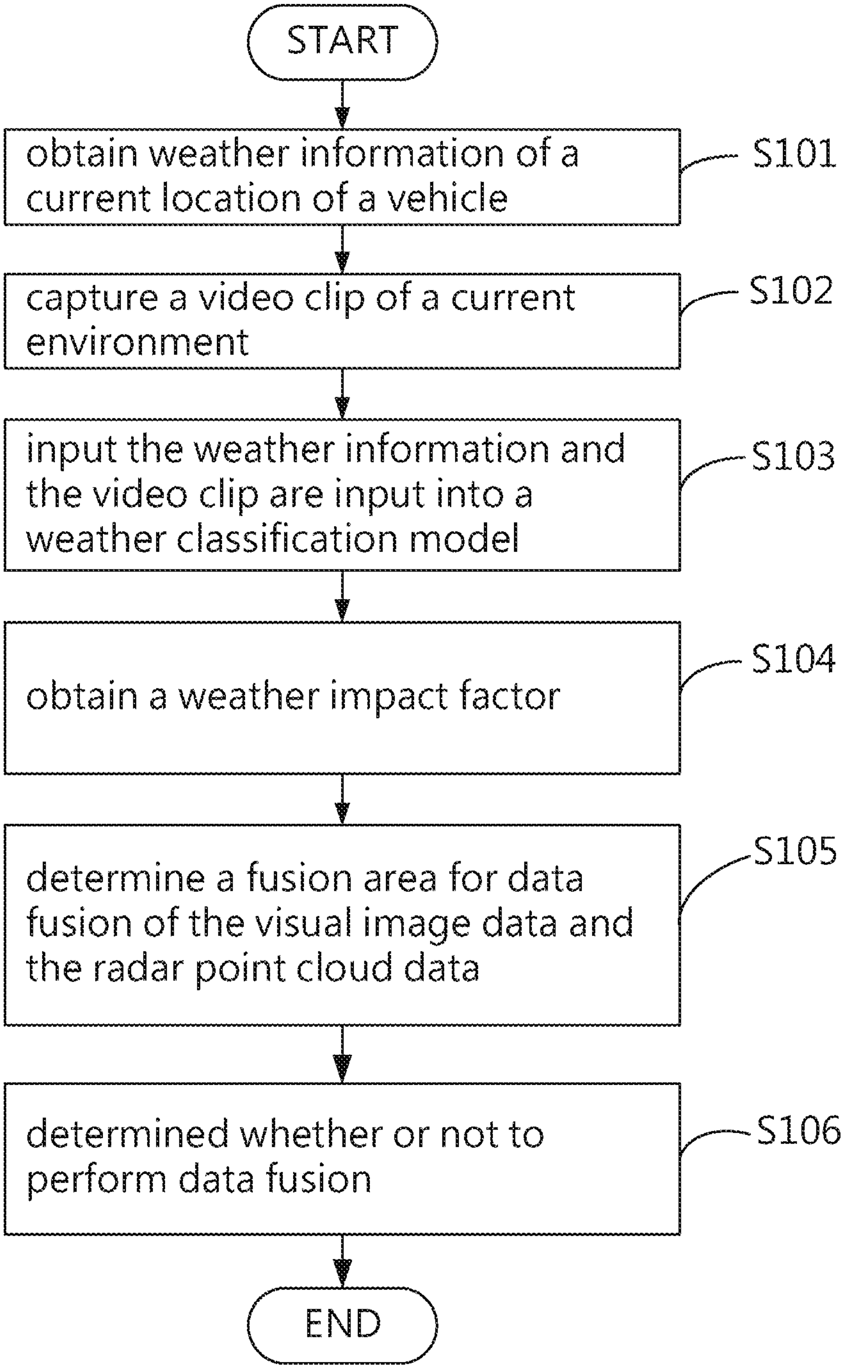
FIG. 1 is a flow chart of a data fusion method to park a vehicle according to one embodiment of the present disclosure.

FIG. 1 is a flow chart of a data fusion method to park a vehicle.

In step S101, weather information of a current location of a vehicle is obtained.

The weather information of the current location of the vehicle can be obtained by means of publicly available data on a network. For example, by connecting to a weather-type application or a weather-type web page to obtain the weather information of the current location.

In step S102, a video clip of a current environment is captured.

In this step, an on-board camera can be used to capture video data of a preset duration, wherein the preset duration is, for example, ten seconds.

In step S103, the weather information and the video clip are input into a weather classification model to obtain a probability of weather conditions output by the weather classification model.

In this step, the weather classification model uses a convolutional neural network model or a deep convolutional neural network model, such as DenseNet or ResNet, without limitation herein. The output of the neural network accesses a softmax classification layer to perform classification of weather conditions to obtain probabilities of weather conditions. For example, assuming that the classification categories of the weather classification model are rainy, sunny, cloudy, foggy, overcast, etc., and the output of the weather classification model is the predicted value of each weather category, the output layer is combined with a softmax function to map the classification output probability between [0, 1], and the classification output probability is normalized and summed to 1. The probability that the weather condition of the current location of the vehicle is of a certain weather type is finally obtained and is called the weather condition probability. In this step, the category with the highest probability is used as the prediction result. For example, after the neural network passes through the softmax layer, the probability of classifying a rainy day as 0.7 is far ahead of the other categories, and 0.7 for rainy day is used as the output probability of the weather condition.

In step S104, corresponding a weather impact factor are obtained on the probability of weather conditions.

In one embodiment, each weather category has a corresponding weather impact factor by default. The weather impact factor $\alpha_{env} \in [0, 1)$, can be dynamically adjusted according to the degree of impact of weather category on object detection. For example, when the weather type is sunny, it can be considered that the weather condition is not an impact factor on object detection, and at this time, the weather impact factor is small, such as $\alpha_{env}=0$. When the weather type is rainy or foggy and other unfavorable weather, the weather condition is one of the important impact on object detection, the weather impact factor is larger, such as $\alpha_{env}$ can be set to a value close to 1.

In step S105, a fusion area for data fusion of the visual image data and the radar point cloud data is determined based on a length of the body of the vehicle, the probability of the weather condition, and the weather impact factor.

In this step, the length of the body of the vehicle is d, the probability of the weather condition is $P_{env}$, and the weather impact factor is $\alpha_{env}$. The first area radius $R_1$ and the second area radius $R_2$ used to divide the fusion area and the observation area are calculated as follows: $R_1=2d\times(1+P_{env}\times\alpha_{env})$, $0\leq\alpha_{env}<1$ and $R_2=3d\times(1+P_{env}\times\alpha_{env})$, $0\leq\alpha_{env}<1$, wherein the fusion area is the coverage area centered on the vehicle and with the first area radius $R_1$ as the radius, and the observation area is the coverage centered on the vehicle and with the second area radius $R_2$ as the radius, after deducing the fusion area.

In step S106, based on the relationship between the distance information of the radar point cloud data and the fusion area, it is determined whether or not to perform data fusion of the visual image data and the radar point cloud data to generate an image of the parking scene.

In this step, whether or not to perform data fusion of the visual image data with the radar point cloud data is determined based on whether or not the distance information of the radar point cloud data falls within the coverage area of the fusion area. When the distance information $L_i$ of the radar point cloud data falls within the coverage area of the fusion area, i.e., $L_i\leq R_1$, data fusion between the visual image data and the radar point cloud data is required. Conversely, when the distance information $L_i$ of the radar point cloud data does not fall within the coverage area of the fusion area but falls within the coverage area of the observation area, i.e., $R_1<L_i\leq R_2$, data fusion of the visual image data with the radar point cloud data is not required.

In one embodiment, there is no restriction on the algorithm for data fusion, and the data fusion can be performed using a deep learning method or a preset feature and rule matching method, and finally the parking scene image is generated based on the fusion result, thereby realizing high-precision three-dimensional target detection of the parking space.

In various embodiments, in addition to the distance information of the radar point cloud data, the velocity information of the radar point cloud data can also be used to determine whether data fusion is required.

Specifically, when the distance information $L_i$ of the radar point cloud data falls within the coverage area of the fusion area, i.e., $L_i \leq R_1$, data fusion between the visual image data and the radar point cloud data is required. When the distance information $L_i$ of the radar point cloud data does not fall into the coverage of the fusion area, but falls into the coverage of the observation area, i.e., $R_1 < L_i \leq R_2$, and the velocity information of the radar point cloud data is larger than the preset safe velocity threshold, then data fusion between the visual graphic data and the radar point cloud data needs to be performed. Otherwise, when the distance information $L_i$ of the radar point cloud data does not fall into the range of the fusion area but falls into the range of the observation area, i.e., $R_1 < L_i \leq R_2$, and the velocity information of the radar point cloud data is less than or equal to the preset safe velocity threshold, then data fusion of the visual image data with the radar point cloud data is not required.

In an example, the default safe velocity threshold is 10 km/h. V is the actual velocity of the object, a positive value of $V_r$ represents the radial velocity observed by the radar point cloud data and the direction of motion is toward the vehicle, and a negative value of $V_r$ represents the direction of motion away from the vehicle. Therefore, based on the comparison of $V_r$ with the preset safe velocity threshold, it can be determined that the object is approaching the vehicle and moving at a speed that exceeds the preset safe speed threshold, or that the object and the vehicle are in the safe velocity zone.

In step S106, for the area where the data fusion is to be performed, object detection of the three-dimensional target can be further performed based on the result of the data fusion.

Figure 2:
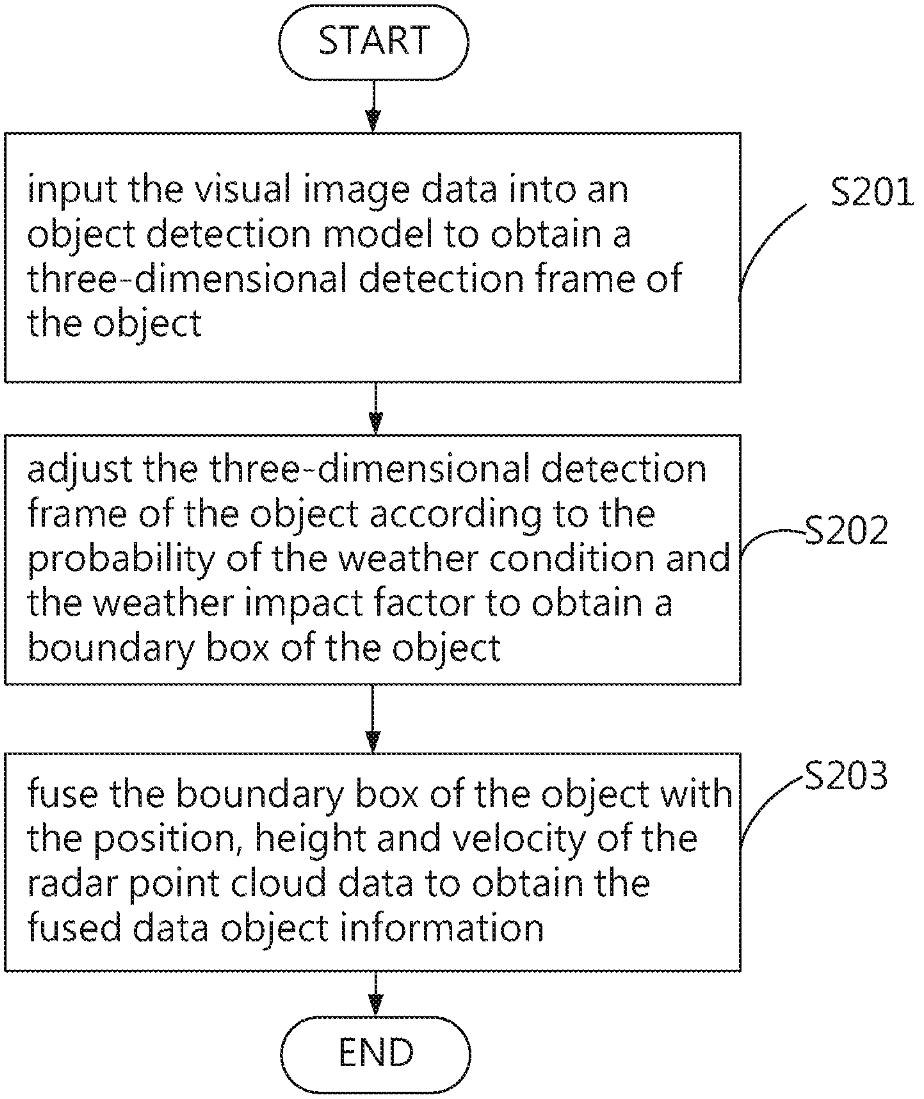
FIG. 2 is flow chart of a data fusion based object detection method according to one embodiment of the present disclosure.

FIG. 2 is a flow chart of the data fusion-based object detection method.

In step S201, the visual image data is input into an object detection model to obtain a three-dimensional detection frame of the object.

In one example, the object detection model can obtain the three-dimensional detection frame of the object directly from the visual image data via a neural network. The objection detection model can use any known image-based three-dimensional detection model, without limitation herein.

For example, if an objection detection model is trained using the CenterNet object detection method, the object detection mode can detect the centroid and the width and height information $(\hat{x}_{co1}, \hat{y}_{co1}, \hat{w}c1, \hat{h}_{c1})$ of the object.

Further, from the center point of the object and the width and height information, the three-dimensional detection frame of the object is obtained as $$\left(\hat{x}_{col} + \delta\hat{x}_{col} - \frac{\hat{w}c1}{2}, \hat{y}_{col} + \delta\hat{y}_{col} - \frac{\hat{h}c1}{2}, \right.$$

-continued $$\left. \hat{x}_{col} + \delta\hat{x}_{col} + \frac{\hat{w}c1}{2}, \hat{y}_{col} + \delta\hat{y}_{col} + \frac{\hat{h}c1}{2}\right).$$

In step S202, the three-dimensional detection frame of the object is adjusted according to the probability of the weather condition and the weather impact factor to obtain a boundary box of the object.

Continuing with the previous example, the three-dimensional detection frame of the object is adjusted using the probability of weather conditions and the weather impact factor as follows:

$$\left(\hat{x}_{col} + \delta\hat{x}_{col} - \frac{\hat{w}c1}{2}\cdot(1 + P_{env}\cdot\alpha_{env}), \hat{y}_{col} + \delta\hat{y}_{col} - \frac{\hat{h}c1}{2}\cdot(1 + P_{env}\cdot\alpha_{env}), \right.$$
$$\left. \hat{x}_{col} + \delta\hat{x}_{col} + \frac{\hat{w}c1}{2}\cdot(1 + P_{env}\cdot\alpha_{env}), \hat{y}_{col} + \delta\hat{y}_{col} + \frac{\hat{h}c1}{2}\cdot(1 + P_{env}\cdot\alpha_{env})\right),$$

and then the adjusted boundary box of the object can be obtained.

In step S203, the boundary box of the object is fused with the position, height and velocity of the radar point cloud data to obtain the fused data object information. The object information includes the boundary box, coordinates, shape, and velocity information of the object.

In one implementation example, the boundary box, coordinates, shape, and velocity information of the object is output to the vehicle. The vehicle can generate an avoidance box for the object based on the boundary box, coordinates, shape, and velocity information of the object when parking the vehicle, display a graphical indication on a display device installed on the vehicle, and guide the driver of the vehicle to avoid the object when parking the vehicle.

In other embodiments, a vehicle-mounted electronic device can generate a parking track based on the current position of the vehicle, driving information, the target parking position, and the boundary box, coordinates, shape, and velocity information of the object to perform automatic parking or to be displayed on a display device mounted on the vehicle to assist the user in autonomous parking control.

Figure 3:
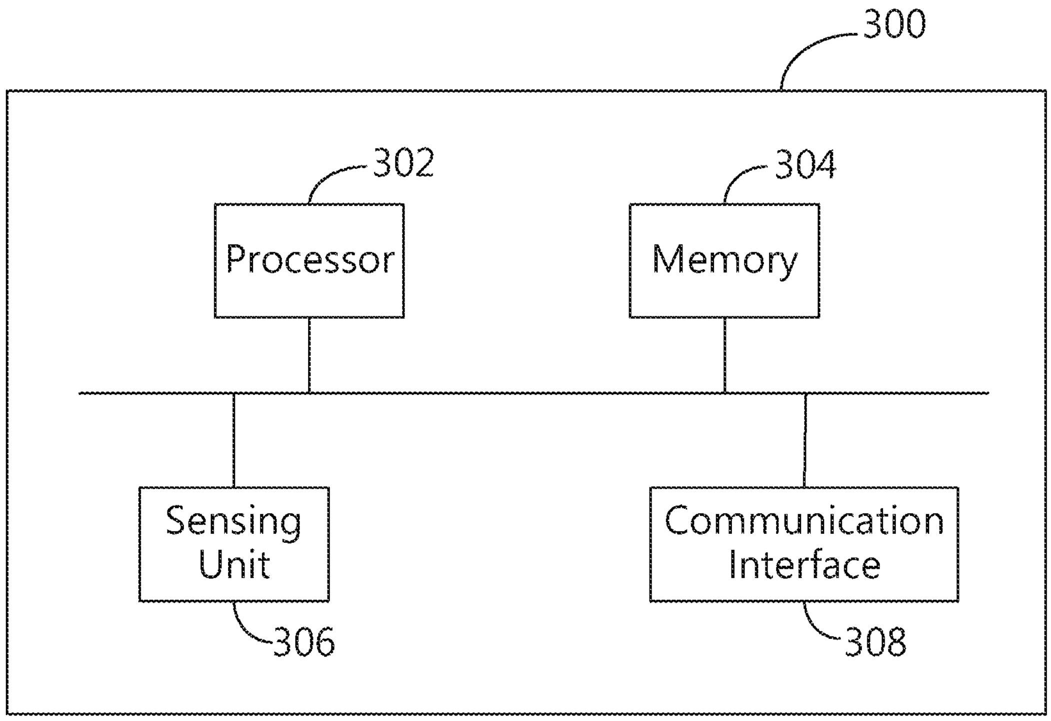
FIG. 3 is a block diagram of a data fusion apparatus to park a vehicle according to one embodiment of the present disclosure.

The method process depicted in FIG. 1 or FIG. 2 can be realized by an apparatus removably or fixedly mounted on the vehicle. In one example, the apparatus is a computer device whose hardware block diagram is shown in FIG. 3. It should be known that the composition of the apparatus 300 shown in FIG. 3 does not constitute a limitation of the embodiments of the invention, and that the apparatus 300 shown in FIG. 3 is simplified for descriptive purpose, and in different embodiments may include a composition of fewer or more components than shown.

FIG. 3 is a block diagram of a data fusion apparatus 300 to park a vehicle. The apparatus 300 includes a processor 302, a memory 304, a sensing unit 306, and a communication interface 308.

In one embodiment, the processor 203 can comprise an integrated circuit, such as a single packaged integrated circuit or a plurality of packaged integrated circuits having the same function or different functions, including one or more central processing units (CPUs), microprocessors, digital processors, combinations of graphic processors and various control chips, and the like, graphic processors and various combinations of control chips, etc. The processor 302 is the control unit of the apparatus 300, which connects the various components of the entire apparatus 300 using various interfaces and circuits to perform various functions of the apparatus 300 and process data by running or executing computer programs or modules stored in the memory 304, and by calling the data stored in the memory 304, for example a data fusion method to park a vehicle.

In one embodiment, the memory 304 is used to store code for a computer program and various data, such a data fusion method to park a vehicle, and to enable fast, automated access to the program or data during operation of the apparatus 300. The memory 304 includes read-only memory (ROM), programmable read-only memory (PROM), erasable programmable read-only memory (OTPROM), electrically erasable programmable read-only memory (EEPROM), compact disc read-only memory (CD-ROM), or other optical disk memory, magnetic disk memory, magnetic tape memory, or any other storage medium that can be read by a computer that can be used to carry or store data.

In one embodiment, the sensing unit 306 comprises a plurality of sensors that sense environmental information about the vehicle's surroundings. For example, the sensing unit 306 can include a positioning system, an inertial measurement unit, a laser radar, a 4D millimeter wave radar, and a camera. The sensing unit 306 and the apparatus 300 may be different, separate devices communicatively connected via wireless or wired means.

In one embodiment, the communication interface 308 includes a communication circuit for communicating data or information with an external apparatus, such as an in-vehicle computing apparatus.

In summary, the data fusion method, apparatus, and non-transitory computer-readable storage medium to park a vehicle of the present invention can be used to reduce the amount of data fusion calculation by determining the area where data fusion is required in combination with the weather impact factor. At the same time, when an object is detected, the boundary box of the object can be adjusted in combination with the weather impact factor so that the fusion information obtained proves to be accurate, which is conducive to assisted parking or automatic parking control.

It will be apparent to those skilled in the art that various modifications and variations can be made to the disclosure without departing from the scope or spirit of the claims. In view of the foregoing, it is intended that the present disclosure covers modifications and variations, provided they fall within the scope of the following claims and their equivalents.

What is claimed is:

1. A data fusion method to park a vehicle, executed in a computing device, the method comprising:

obtaining weather information of a current location of the vehicle;

capturing a video segment of a surrounding environment of the vehicle;

inputting the weather information and the video segment into a weather classification model to obtain a weather condition probability;

obtaining a weather impact factor according to the weather condition probability;

determining a fusion area between visual image data and radar point cloud data according to a length of a body of the vehicle, the weather condition probability, and the weather impact factor, wherein the determining the fusion area further comprises: representing the length of the body of the vehicle as d, the weather condition probability as $P_{env}$, and the weather impact factor as $\alpha_{env}$; calculating a first area radius $R_1$ for distinguishing the fusion area from an observation area using a first formula: $R_1=2d\times(1+P_{env}\times\alpha_{env})$, $0\leq\alpha_{env}<1$; calculating a second area radius $R_2$ using a second formula: $R_2=3d\times(1+P_{env}\times\alpha_{env})$, $0\leq\alpha_{env}<1$; and defining the fusion area as a first coverage range centered on the vehicle with the first area radius $R_1$ and the observation area as a second coverage range centered on the vehicle with the second area radius $R_2$ excluding the fusion area; and determining whether to perform data fusion between the visual image data and the radar point cloud data to generate a parking scene image based on the relationship between distance information of the radar point cloud data and the fusion area.

2. The data fusion method of claim 1, wherein the obtaining weather information of a current location of a vehicle comprises:

Obtaining the weather information by connecting to a weather application software.

3. The data fusion method of claim 1, wherein the capturing a video segment of a surrounding environment of the vehicle comprises:

collecting video data of a preset duration using a vehicle-mounted camera.

4. The data fusion method of claim 1, wherein the weather classification model adopts a neural network model, and an output of the neural network model is connected to a softmax classification layer for classifying weather conditions to obtain the weather condition probability.

5. The data fusion method of claim 4, wherein the weather conditions comprise rainy, sunny, cloudy, foggy, and overcast conditions.

6. The data fusion method of claim 5, wherein each weather condition has a preset corresponding weather impact factor, which presents a degree of impact of the weather condition on object detection.

7. The data fusion method of claim 1, wherein the determining whether to perform data fusion between the visual image data and the radar point cloud data to generate a parking scene image based on the relationship between distance information of the radar point cloud data and the fusion area further comprises:

if the distance information $L_i$ of the radar point cloud data is smaller than or equal to the first area radius $R_1$, performing data fusion between the visual image data and the radar point cloud data.

8. A data fusion apparatus configured for parking a vehicle, the apparatus comprising:

a non-transitory memory storage storing processor-executable instructions; and at least one processor coupled to the memory to receive the processor-executable instructions, wherein, upon execution of the processor executable instructions, the at least one processor:

obtaining weather information of a current location of the vehicle;

capturing a video segment of a surrounding environment of the vehicle;

inputting the weather information and the video segment into a weather classification model to obtain a weather condition probability;

obtaining a weather impact factor according to the weather condition probability;

determining a fusion area between visual image data and radar point cloud data according to a length of a body of the vehicle, the weather condition probability, and the weather impact factor, wherein the determining the fusion area further comprises: representing the length of the body of the vehicle as d, the weather condition probability as $P_{env}$, and the weather impact factor as $\alpha_{env}$; calculating a first area radius $R_1$ for distinguishing the fusion area from an observation area using a first formula: $R_1=2d\times(1+P_{env}\times\alpha_{env})$, $0\leq\alpha_{env}<1$; calculating a second area radius $R_2$ using a second formula: $R_2=3d\times(1+P_{env}\times\alpha_{env})$, $0\leq\alpha_{env}<1$; and defining the fusion area as a first coverage range centered on the vehicle with the first area radius $R_1$ and the observation area as a second coverage range centered on the vehicle with the second area radius $R_2$ excluding the fusion area; and determining whether to perform data fusion between the visual image data and the radar point cloud data to generate a parking scene image based on the relationship between distance information of the radar point cloud data and the fusion area.

9. A non-transitory computer readable storage medium storing processor-executable instructions which, when executed by at least one processor, cause the at least one processor to perform a data fusion method to park a vehicle, the data fusion method comprising:

obtaining weather information of a current location of the vehicle;

capturing a video segment of a surrounding environment of the vehicle;

inputting the weather information and the video segment into a weather classification model to obtain a weather condition probability;

obtaining a weather impact factor according to the weather condition probability;

determining a fusion area between visual image data and radar point cloud data according to a length of a body of the vehicle, the weather condition probability, and the weather impact factor, wherein the determining the fusion area further comprises: representing the length of the body of the vehicle as d, the weather condition probability as $P_{env}$, and the weather impact factor as $\alpha_{env}$; calculating a first area radius $R_1$ for distinguishing the fusion area from an observation area using a first formula: $R_1=2d\times(1+P_{env}\times\alpha_{env})$, $0\leq\alpha_{env}<1$; calculating a second area radius $R_2$ using a second formula: $R_2=3d\times(1+P_{env}\times\alpha_{env})$, $0\leq\alpha_{env}<1$; and defining the fusion area as a first coverage range centered on the vehicle with the first area radius $R_1$ and the observation area as a second coverage range centered on the vehicle with the second area radius $R_2$ excluding the fusion area; and determining whether to perform data fusion between the visual image data and the radar point cloud data to generate a parking scene image based on the relationship between distance information of the radar point cloud data and the fusion area.

* * * * *